(12) United States Patent
Lamontagne et al.

(10) Patent No.: US 10,561,075 B2
(45) Date of Patent: Feb. 18, 2020

(54) FORESTRY DEVICE WITH ARTICULATED ACCUMULATING ARM

(71) Applicant: Prenbec Equipment Inc., Montreal (CA)

(72) Inventors: Yvan Lamontagne, St. Felicien (CA); Etienne Minville, Mirabel (CA); Pierre Perron, Saint-Prime (CA)

(73) Assignee: QUADCO INC., Vancouver, British Columbia (CA)

( * ) Notice: Subject to any disclaimer, the term of this patent is extended or adjusted under 35 U.S.C. 154(b) by 0 days.

(21) Appl. No.: 14/761,676

(22) PCT Filed: Jun. 17, 2014

(86) PCT No.: PCT/CA2014/050571
§ 371 (c)(1),
(2) Date: Jul. 17, 2015

(87) PCT Pub. No.: WO2015/192199
PCT Pub. Date: Dec. 23, 2015

(65) Prior Publication Data
US 2017/0055465 A1    Mar. 2, 2017

(51) Int. Cl.
*A01G 23/081*   (2006.01)

(52) U.S. Cl.
CPC .................. *A01G 23/081* (2013.01)

(58) Field of Classification Search
CPC ...... A01G 23/08; A01G 23/083; A01G 23/00; A01G 23/095
USPC .................................................. 144/4.1, 4
See application file for complete search history.

(56) References Cited

U.S. PATENT DOCUMENTS

| | | | | |
|---|---|---|---|---|
| 3,851,686 A | * | 12/1974 | Hultdin | A01G 23/08 144/334 |
| 4,276,918 A | * | 7/1981 | Sigouin | A01G 23/095 144/24.13 |
| 4,412,777 A | * | 11/1983 | Forslund | B66C 3/16 144/34.1 |
| 4,491,163 A | * | 1/1985 | Kurelek | A01G 23/091 144/24.13 |

(Continued)

FOREIGN PATENT DOCUMENTS

| | | |
|---|---|---|
| CA | 2 143 155 | 8/1996 |
| CA | 2 209 063 | 12/1998 |

(Continued)

*Primary Examiner* — Shelley M Self
*Assistant Examiner* — Smith Oberto Bapthelus
(74) *Attorney, Agent, or Firm* — Jacobson Holman, PLLC.

(57) ABSTRACT

A forestry device, for example, a bunching and felling head configured to group trees, includes a support frame and an accumulation area located proximate to the support frame. The device includes at least a first arm rotatable relative to the support frame, to gather trees, and at least one accumulating arm rotatable relative to the support frame, to secure one or more gathered trees in the accumulation area and to retract from the accumulation area to allow a newly gathered tree to be added in the accumulation area. The one or more accumulating arm(s) include(s) an inner arm pivotable relative to the support frame and an outer arm pivotable relative to the inner arm. The outer arm has at least one articulation dividing the outer arm into at least a proximate member and a distal member.

33 Claims, 16 Drawing Sheets

(56) References Cited

U.S. PATENT DOCUMENTS

| | | | |
|---|---|---|---|
| 5,697,412 A * | 12/1997 | Kurelek | A01G 23/081 144/336 |
| 5,704,406 A * | 1/1998 | Tammisalo | A01G 23/08 144/335 |
| 5,794,674 A * | 8/1998 | Kurelek | A01G 23/081 144/336 |
| 5,816,299 A | 10/1998 | Mathews et al. | |
| 5,931,210 A | 8/1999 | Kurelek | |
| 6,068,035 A | 5/2000 | DiSabatino et al. | |
| 6,123,124 A | 9/2000 | Naud | |
| 6,152,201 A | 11/2000 | Kurelek | |
| 6,189,585 B1 | 2/2001 | Johansson | |
| 6,374,877 B1 * | 4/2002 | Wildey | A01G 23/081 144/335 |
| 6,382,274 B1 * | 5/2002 | Hicks | A01G 23/091 144/336 |
| 6,578,610 B2 * | 6/2003 | Ristolainen | A01G 23/081 144/24.13 |
| 6,640,850 B1 * | 11/2003 | Hicks | A01G 23/091 144/336 |
| 6,691,752 B2 | 2/2004 | DiSabatino | |
| 6,779,570 B2 * | 8/2004 | Tardif | A01G 23/003 100/100 |
| 7,017,631 B2 | 3/2006 | Fenton et al. | |
| 7,174,932 B2 * | 2/2007 | Mauchlen | A01G 23/081 144/34.1 |
| 7,228,880 B2 | 6/2007 | Taillon | |
| 7,237,584 B2 * | 7/2007 | DiSabatino | A01G 23/081 144/3.1 |
| 7,306,018 B2 * | 12/2007 | Hicks | A01G 23/081 144/336 |
| 7,681,608 B2 * | 3/2010 | Disabatino | A01G 23/08 144/34.1 |
| 7,699,081 B2 * | 4/2010 | Mauchlen | A01G 23/081 144/34.1 |
| 7,832,437 B2 * | 11/2010 | Trom | A01G 23/08 144/336 |
| 7,938,154 B2 | 5/2011 | Quirke et al. | |
| 8,066,040 B2 * | 11/2011 | Di Sabatino | A01G 23/081 144/34.1 |
| D678,356 S * | 3/2013 | Disabatino | D15/28 |
| 9,301,457 B2 * | 4/2016 | DiSabatino | A01G 23/081 |
| 9,526,217 B2 * | 12/2016 | DiSabatino | A01G 23/081 |
| 2002/0040741 A1 * | 4/2002 | Ristolainen | A01G 23/081 144/4.1 |
| 2004/0112463 A1 * | 6/2004 | Hicks | A01G 23/081 144/4.1 |
| 2004/0216809 A1 | 11/2004 | Wildey | |
| 2004/0221921 A1 | 11/2004 | DiSabatino | |
| 2006/0096665 A1 | 5/2006 | DiSabatino | |
| 2007/0107803 A1 | 5/2007 | Mauchlen | |
| 2007/0113925 A1 | 5/2007 | DiSabatino | |
| 2008/0017273 A1 | 1/2008 | Ronkko et al. | |
| 2010/0101684 A1 * | 4/2010 | Sabatino | A01G 23/081 144/4.1 |
| 2010/0313999 A1 | 12/2010 | Smythe | |
| 2010/0314000 A1 | 12/2010 | Smythe et al. | |
| 2011/0132495 A1 | 6/2011 | Lajoie et al. | |
| 2012/0018043 A1 | 1/2012 | Keskinen et al. | |
| 2012/0312421 A1 * | 12/2012 | Trom | A01G 23/081 144/4.1 |
| 2016/0083933 A1 * | 3/2016 | Anderson | A01G 23/081 280/400 |
| 2017/0055465 A1 * | 3/2017 | Lamontagne | A01G 23/081 |
| 2017/0071141 A1 * | 3/2017 | Koponen | A01G 23/081 |

FOREIGN PATENT DOCUMENTS

| | | | |
|---|---|---|---|
| CA | 2 291 613 | 12/1998 | |
| CA | 2 210 140 | 1/1999 | |
| CA | 2 242 538 | 3/1999 | |
| CA | 2 242 625 | 1/2000 | |
| CA | 2 252 235 | 2/2000 | |
| CA | 2 263 117 | 8/2000 | |
| CA | 2 310 877 | 12/2000 | |
| CA | 2 312 685 | 12/2000 | |
| CA | 2 315 558 | 2/2001 | |
| CA | 2 448 11 | 6/2004 | |
| CA | 2 422 987 | 9/2004 | |
| CA | 2 466 329 | 11/2004 | |
| CA | 2 466 384 | 11/2004 | |
| CA | 2 563 336 | 10/2005 | |
| CA | 2692522 A1 * | 12/2008 | A01G 23/081 |
| WO | WO 96/25845 | 8/1996 | |
| WO | WO 2008/145822 | * 12/2008 | |
| WO | WO 2012/170598 | 12/2012 | |

* cited by examiner

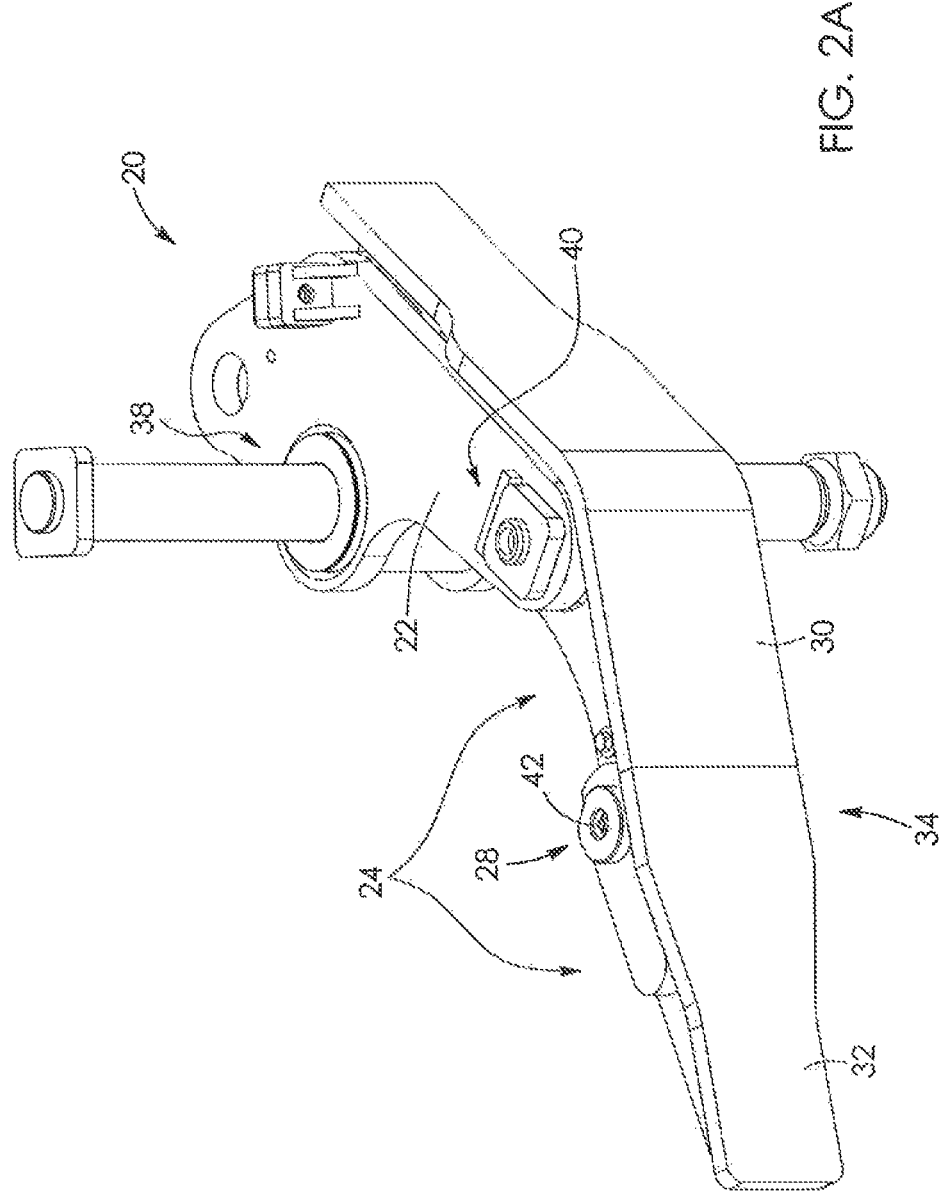

FORESTRY DEVICE WITH ARTICULATED ACCUMULATING ARM

CROSS-REFERENCE TO RELATED APPLICATION

This application is a national stage of PCT/CA2014/050571, filed Jun. 17, 2014.

BACKGROUND OF THE INVENTION

1. Field of Invention

The present invention relates to the field of forestry devices, and more particularly relates to forestry devices for grouping trees, such as a felling and bunching head, provided with an articulated accumulating arm.

2. Description of the Prior Art

Forestry devices typically include at least a pair of arms attached to a frame for gathering and holding trees in an accumulation area. The first arm sweeps trees into the accumulation area. The second arm is an accumulating arm which holds the trees in the accumulation area, freeing the first arm to sweep more trees into the accumulation area.

For example, in a felling and bunching head, the first arm is a grab arm which is generally a long rigid arm pivotally connected to the frame, such that it is adapted to perform a wide sweeping motion towards the accumulation area and to retract from the accumulation area along the same path. The accumulating arm is generally composed of an inner and an outer arm; the inner arm being pivotally connected to the frame and the outer arm being pivotally connected to the distal end of the inner arm. With this configuration, the accumulating arm is adapted to perform a wide sweeping motion towards the accumulation area, but can be retracted along a more compact path to avoid interference with trees newly acquired by the grab arm. Such a pair of arms is disclosed, for example, in U.S. Pat. No. 5,697,412 (Kurelek) and U.S. Pat. No. 7,832,437 (Trom). Known accumulating arms are thus foldable at the junction of the inner and the outer arm.

In operation, the grab arm sweeps a first tree (or group of trees) into the accumulation area. The accumulating arm is then closed on the tree, holding the tree in the accumulation area. Now that the tree is secured by the accumulating arm, the grab arm is retracted to its open position. The grab arm then sweeps a second tree into the accumulation area, holding it tightly against the accumulating arm in the accumulation area. The accumulating arm is then retracted from the accumulation area, while the grab arm holds both trees in the accumulation area. Next, the accumulating arm is closed to hold both trees in the accumulation area, thus allowing the grab arm to be retracted to its open position with the trees secured tightly. The process can be repeated until the accumulation area is filled to capacity.

In order to retract the accumulating arm after a second tree is gathered, the accumulating arm must be able to move along a path that is clear of the trees swept by the grab arm.

Disadvantageously, the capacity of the described felling and bunching head is limited by the retraction path of the accumulating arm. In operation, although there might still be room for more trees in the accumulation area, if a tree occupies a space which the accumulating arm requires to retract, the arm will be unable to retract and will therefore be unable to accumulate more trees. In order to increase the capacity of the felling and bunching head, it is desirable to have an accumulating arm whose retraction path is reduced and can thus retract while more trees are being held in the accumulation area.

Existing arms of forestry devices are insufficient as they are not designed to reduce the retraction path of the accumulating arm. For example, Kurelek discloses in U.S. Pat. No. 5,697,412 a tucker arm that is provided with a single hinge. This allows the arm to retract easily while the accumulation area is at low capacity. When nearing the accumulation area's full potential capacity, however, the arm will not be able to retract. In this situation, the accumulating arm only needed to close a small amount to hold the large bunch of trees. The arm, having only closed a small amount, will have very little room to retract. With the single hinge design in Kurelek, the accumulating arm will not have enough space to retract in this situation, thus significantly limiting the accumulation capacity of the felling and bunching head.

Furthermore, the efficiency of operation of the system is also dictated by the motion of the accumulating arm. After gathering a first tree, the accumulating arm must retract and engage the gathered tree before a subsequent tree can be gathered. The operator must therefore wait for the motion of the accumulating arm to complete before being able to gather new trees, resulting in down time. The farther the accumulating arm needs to travel, the longer the down time. Additionally, moving the arm consumes energy proportional to the travel distance of the arm. The farther the accumulating arm needs to travel, the more energy is required. As such, reducing the distance through which the accumulator arm needs to travel when retracting and engaging will reduce the down time between gathering trees, allowing the operator to collect more trees in a shorter period of time, and will reduce the energy required to operate the system.

Existing forestry devices are insufficient as they do not reduce the travel distance of the accumulating arm. For example, Trom discloses in U.S. Pat. No. 7,832,437 a bunching finger comprising an inner and an outer arm. The arms are driven by an actuator, which in operation requires the arms to be fully retracted in order to clear a previously cut tree. The retraction motion further involves movement of both the inner and outer arm. No efforts are taken to reduce or simplify the motion required to retract the arms.

In view of the above, there is a need for an improved forestry device provided with an accumulating arm which increases the accumulating capacity of the device. It would also be advantageous is such forestry device to increases the efficiency of operation of the device by minimizing the space required to retract the accumulating arm.

SUMMARY OF THE INVENTION

According to an aspect of the invention, a forestry device for gathering trees one after the other is provided. The forestry device comprises a support frame, and an accumulation area located proximate to the support frame. The device is provided with at least a first arm rotatable relative to the support frame to gather trees, and at least one accumulating arm rotatable relative to the support frame to secure one or more trees in the accumulation area and to retract from the accumulation area to allow newly gathered trees to be added in the accumulation area. The at least one accumulating arm comprises an inner arm pivotable relative to the support frame and an outer arm pivotable relative to the inner arm. The outer arm is further provided with at least one articulation dividing the outer arm into at least a proximate member and a distal member.

According to a possible embodiment of the invention, the outer arm of the accumulating arm is movable between an extended configuration and a folded configuration. In a similar embodiment, the distal member is biased away from the proximate member in the extended configuration, and the distal member is folded inwardly towards the proximate member in the folded configuration. Preferably, with the inner and outer arms pivotally mounted about a pivot axis, the span extending from the pivot axis to a distal end of the distal member is smaller with the arm in the folded configuration compared to the arm in the extended configuration.

In possible embodiments, the outer arm comprises at least one intermediate member disposed between the proximate and distal members, each of the adjacent members being connected by articulations. Preferably, each of the members is biased away from one relative to the other.

In a preferred embodiment, the accumulating arm comprises at least three pivot axes. The axes may comprise a first pivot axis for allowing the inner arm to pivot relative to the support frame, a second pivot axis allowing the outer arm to pivot relative to the inner arm, and at least a third pivot axis allowing the members of the outer arm to pivot one relative to the other.

In an exemplary embodiment, the articulation may comprise a hinge joint. Furthermore, the device may comprise a first biasing element for biasing the outer arm away from the inner arm, and a second biasing element biasing the members of the outer arm away from one another. The biasing elements may comprise a spring, rubber band, or hydraulic cylinder. Additionally, the outer arm may be provided with a stopping mechanism to constrain the outward rotation of the members.

In possible variations of the present invention, the support frame of the forestry device comprises a portion configured to receive a severing device. In the case of a felling and bunching head, the portion may be a lower portion of the support frame. The severing device may comprise one of a rotatable saw disk, shears, blades and a chain saw. In such embodiments, the accumulation area can be a pocket located proximate to the lower portion of the support frame, or possibly in other embodiments proximate to a frontward portion of the support frame.

In yet other possible variations of the present invention, the first arm and accumulating arm may be disposed on the same or opposite sides relative to the accumulating area. The arms, having separate pivot axes relative to the support frame, may have those axes being coaxial or offset from one another. The accumulating arm may be disposed above the first arm, or vice-versa. Additionally, the first arm may be configured similarly to the accumulating arm. In other words, it is possible for the forestry device to include two or more accumulating arms, with or without a grab arm.

According to another aspect of the present a forestry device configured to group trees is provided. The forestry device comprises a support frame, the support frame comprising a portion configured to receive a severing device: an accumulation area located proximate to the said portion of the support frame; at least a first arm for gathering severed trees and at least one accumulating arm for accumulating severed trees in the accumulation area. The arms are pivotally mounted relative to the support frame, each of the arms being movable from an open position in which the arms are clear of the accumulation area for receiving severed trees to a closed position in which the arm retains at least one severed tree in the accumulation area. The at least one accumulating arm comprises an inner arm pivotable relative to the support frame and an outer arm pivotable relative to the inner arm. The outer arm comprises at least two members, the outer arm being movable between a folded configuration in which the members are inwardly folded and an extended configuration in which the members are biased away one from the other(s).

An aspect of the present invention also provides a method for grouping trees using a forestry device, comprising the steps of: a) gathering a first tree with a first arm toward an accumulating area of the forestry device; b) retaining the first tree in the accumulating area with an accumulating arm and retracting the first arm; c) gathering a second tree with the first arm toward the accumulating area; d) retracting the accumulating arm away from the accumulating area by folding the accumulating arm in three different sections; and e) retaining the first and second trees in the accumulating area with the accumulating arm while retracting the first arm.

The method may further comprise the steps of: severing the first tree with a severing device of the forestry device, said step occurring prior to step a); severing the second tree with the severing device, said step occurring prior to step c). Further the method may include repeating steps a) through e) in order to accumulate multiple trees in the accumulation area.

BRIEF DESCRIPTION OF THE DRAWINGS

Other objects, advantages, and features will become more apparent upon reading the following non-restrictive description of the embodiments thereof, given for the purpose of exemplification only, with reference to the accompanying drawings in which:

FIG. 2A is a perspective view of an accumulating arm of the forestry device shown in an extended configuration, according to a possible embodiment.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In the following description, the same numerical references refer to similar elements. The embodiments described in the present description are preferred embodiments only; they are given solely for exemplification purposes. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom.

In addition, it will be appreciated that positional descriptions such as "top", "side", "lower", and the like should, unless otherwise indicated, be taken in the context of the figures and should not be considered as limiting or as implying a required orientation during use.

Figure 1A:
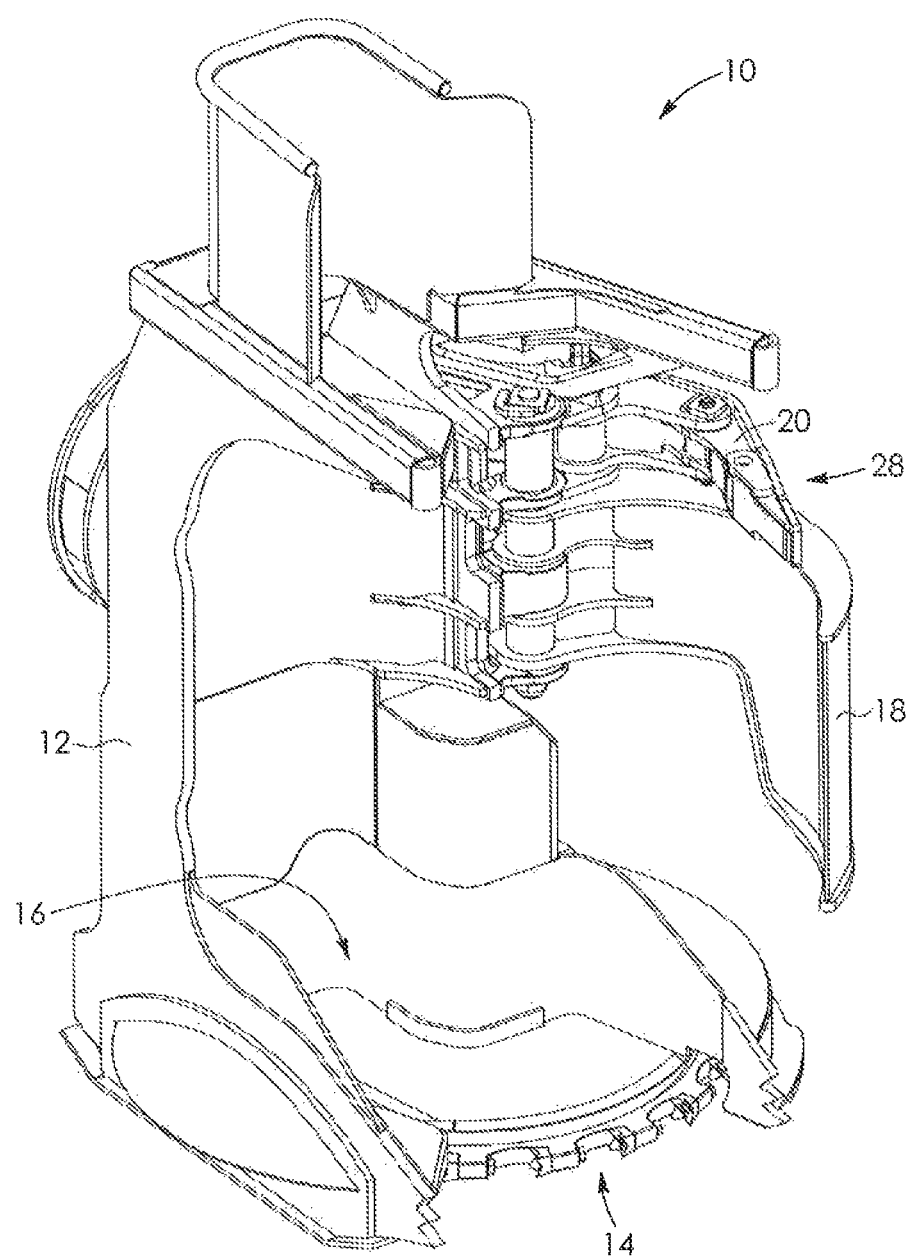
FIG. 1A is a perspective view of a forestry device, according to an embodiment of the invention.
Figure 7:
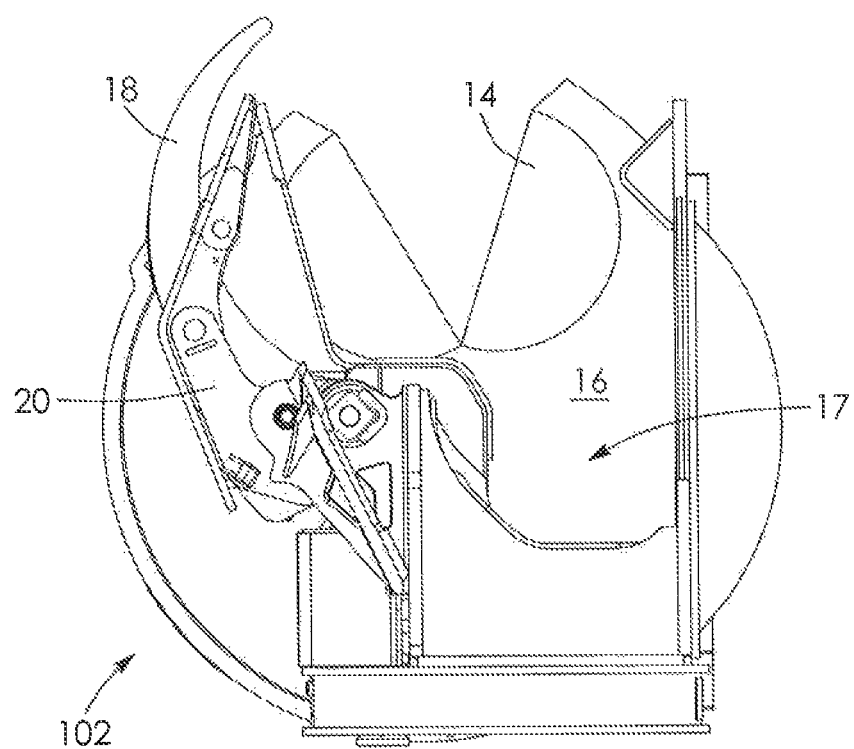
FIG. 7 is a top view of a forestry device according to yet another alternate embodiment of the invention.
Figure 8:
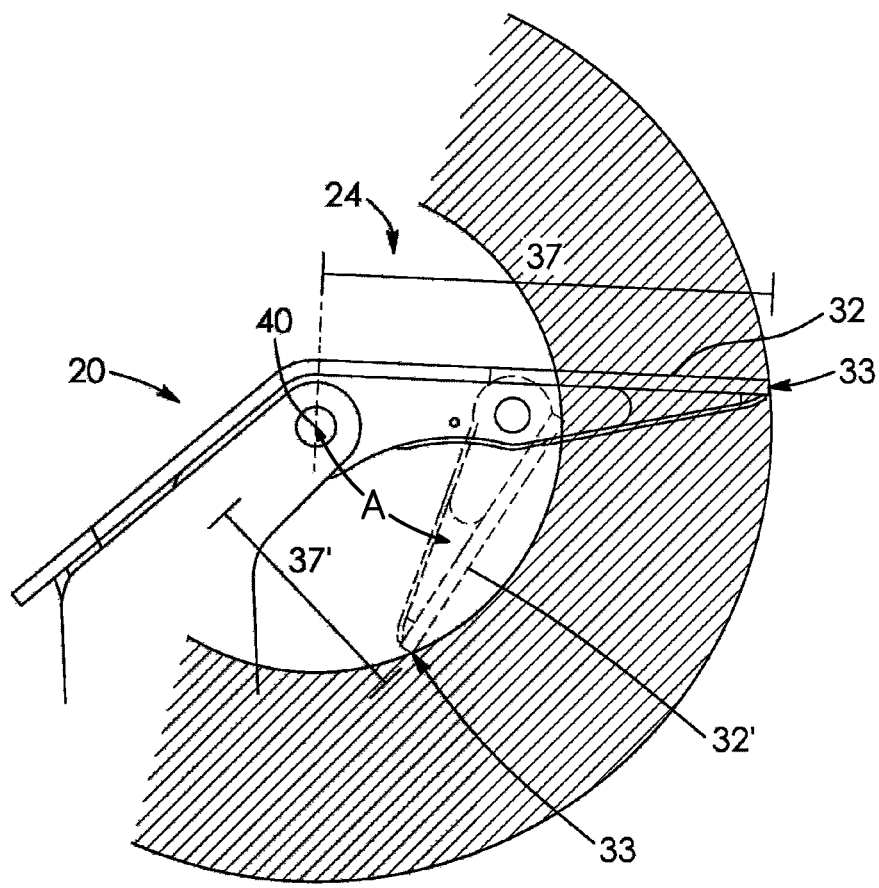
FIG. 8 is a top view of the accumulating arm according to a possible embodiment, demonstrating the increased clearance of the arm.

NUMERAL REFERENCES USED IN THE FIGURES 8, 8', 8" tree
10, 100, 102 forestry device
12 support frame
14 severing device
16, 160 accumulation area
18, 180 first arm
20, 200 accumulating arm
22, 220 inner arm of accumulating arm
24, 240 outer arm of accumulating arm
28 articulation
30 proximate member of outer arm
31 intermediate member of outer arm
32 distal member of outer arm
33 distal end of distal member
34 extended configuration
36 folded configuration
37 span
38, 380 first pivot axis (outer arm pivoting relative to frame)
40, 400 second pivot axis (inner arm pivoting relative to outer arm)
42 third pivot axis (outer member pivoting relative to the inner member)
44 hinge joint
48 stopping mechanism
50 second biasing element
51 anchor point
52 first biasing element
54, 540 first arm pivot axis
56, 560 interference circle Referring to FIG. 1A, a forestry device 10 according to a first embodiment is shown. A forestry device is any device used in the logging process, and includes devices such as fellers, harvesters, forwarders, and skidders, among others. In the present embodiment, for illustrative purposes only, the forestry device 10 is a felling and bunching head. Of course, other forestry devices can also benefit from the present invention, particularly devices employing a mechanism to handle or grapple several trees which are added sequentially (i.e. one after the other) in an accumulation area. The forestry device 10 comprises a support frame 12 with a first arm 18 and an accumulating arm 20. In the present embodiment, the first arm 18 is a grab arm and is thus a wide rigid member. In alternate embodiments, the first arm 18 may take different forms; for example, it could also be an accumulating arm or a narrow arm suitable for grappling. The accumulating arm 20 comprises an outer arm and an inner arm; the outer arm is provided with an articulation 28. The articulation 28 allows a distal portion of the outer arm to pivot relative to a proximate portion of the outer arm. The arms 18, 20 are pivotally connected relative to the support frame 12 such that they are configured to sweep trees towards an accumulation area 16. The accumulation area 16 can be any location near the rear and/or front of the support frame 12 towards which trees are swept by the arms 18 and 20. In the present embodiment, the accumulation area 16 is configured to include a pocket 17 (see, e.g., FIG. 1B) adapted to receive gathered trees. Of course, the accumulation area 16 does not need to be a pocket. For example, in the case of a harvester, the accumulation area 16 could be the space between the feed rollers. In the present embodiment, the arms 18, 20 are connected directly to the support frame 12. Other configurations are possible, so long as they are pivotable relative to the frame. For example, the arms 18, 20 could be pivotally connected to an intermediate member which is itself connected to the frame. Additionally, in the present embodiment, the first arm 18 and the accumulating arm 20 are attached to the same side of the support frame 12, the first arm 18 being located at a lower vertical position than the accumulating arm 20. Other configurations are possible, of course. For example, the arms 18, 20 could be mounted on opposite sides of the frame, and/or the first arm 18 could be located at a higher vertical position relative to the accumulating arm 20. In the present embodiment, the forestry device 10 further comprises a severing device 14, in this case a rotatable saw disk, located near a lower portion of the support frame 12. The saw 14 is configured to sever trees gathered by the arms 18, 20. According to alternate embodiments, the severing device 14 could take other forms, such as a shear, as shown in FIG. 7, blades or a chain saw. It may also be disposed at other locations, such as near the top of the support frame 12. In yet other embodiments, there may be no severing device at all.

Figure 1B:
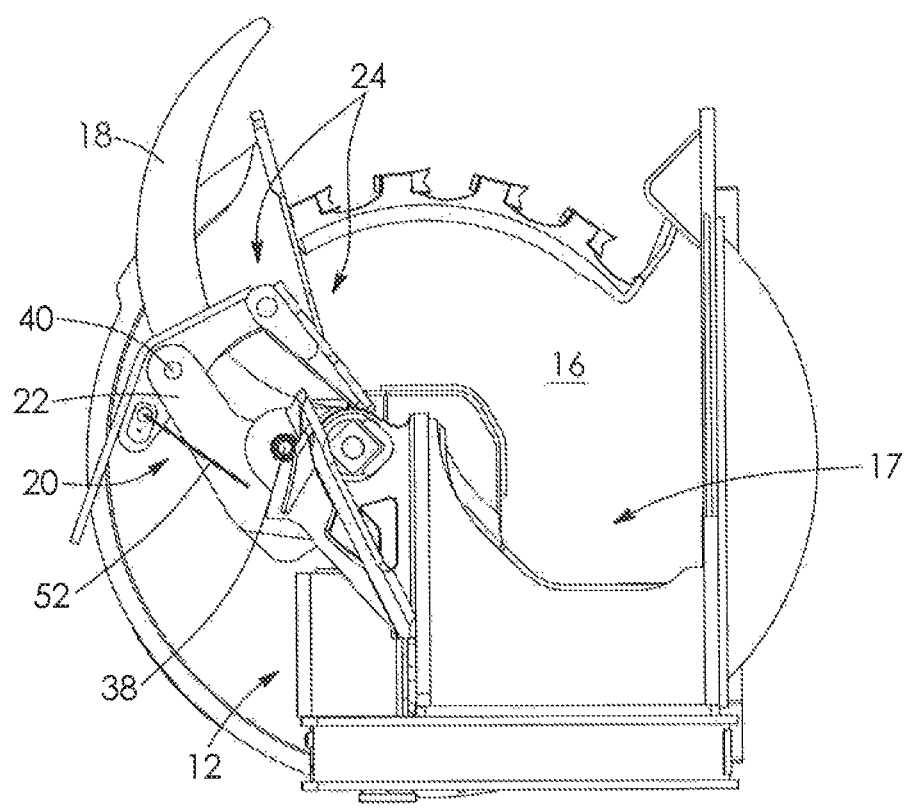
FIG. 1B is a top view of the forestry device in FIG. 1A.

Referring to FIG. 1B, a top view of the forestry device 10 of FIG. 1A is shown. The accumulating arm 20 consists of an inner arm 22 and an outer arm 24. The inner arm 22 is provided with a first pivot axis 38 around which the inner arm 22 can pivot relative to the support frame 12. A second pivot axis 40 allows the outer arm 24 to pivot relative to the inner arm 22. In the present embodiment, the accumulating arm 20 is biased towards an open configuration with a first biasing element 52, in this case a rubber band. Other types of biasing elements, such as a spring, hydraulic cylinder, or any other equivalent are also possible. In the open configuration of the accumulating arm 20, the outer arm 24 is biased away from the inner arm 22, around the second pivot axis 40. Note that in this figure the outer arm 24 is shown in a folded configuration for illustrative purposes only. Typically, a force applied to the outer arm 24 is needed to fold the arm.

Figure 2B:
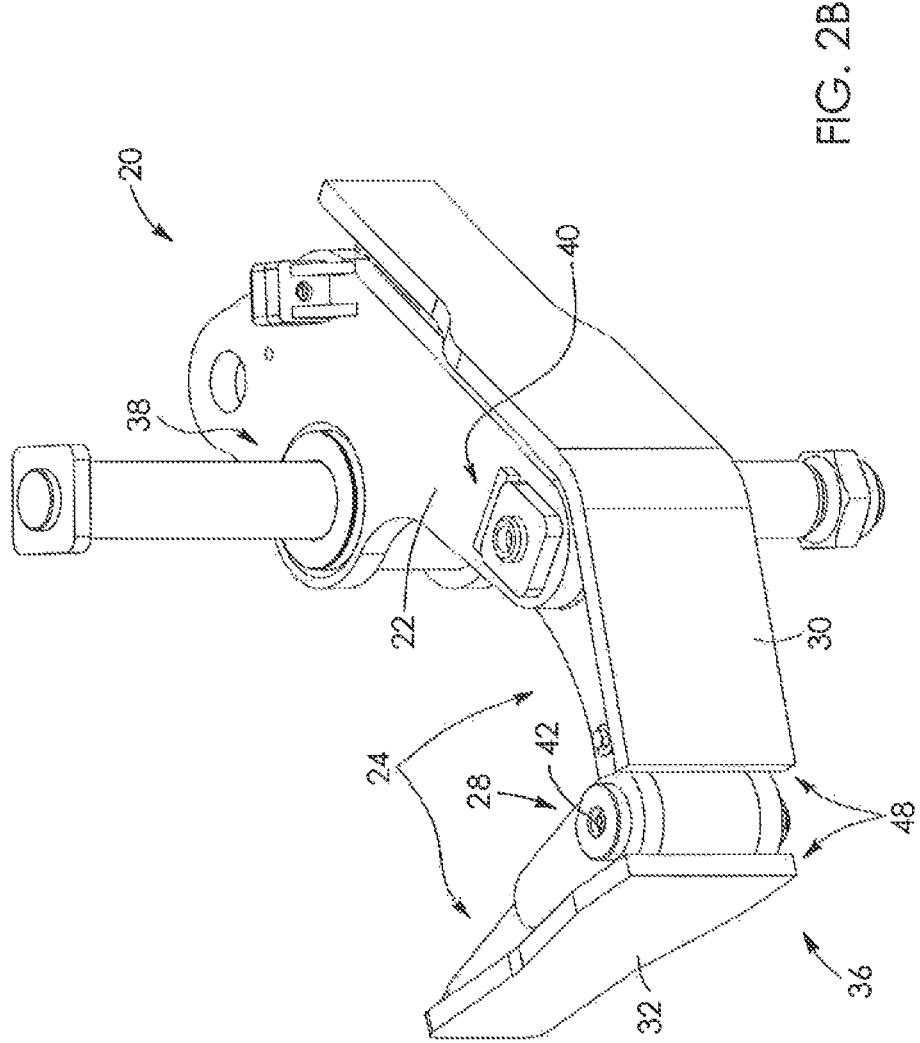
FIG. 2B is a perspective view of the accumulating arm in FIG. 2A in a folded configuration.

Referring to FIGS. 2A and 2B, an individual view of the accumulating arm 20 according to the embodiment of FIGS. 1A and 1B is shown. The outer arm 24 is divided into a proximate member 30 and a distal member 32 by the articulation 28, allowing the distal member 32 to pivot relative to the proximate member 30 around a third pivot axis 42. In the present embodiment, the third pivot axis 42 is located substantially at mid-length of the outer arm 24, but this can vary in other embodiments. For example, in other embodiments, the distal member 32 can be much longer than the proximate member 30. The distal member 32 can pivot inwardly towards the proximate member 30, such that it can move between an extended configuration 34, where the distal member 32 is biased away from the proximate member 30 (as shown in FIG. 2A), and a folded configuration 36 (as shown in FIG. 2B), where the distal member 32 is folded inwardly towards the proximate member 30. A stopping mechanism 48 serves to constrain the outward motion of the distal member 32, maintaining it in the extended configuration 34. In the present embodiment, the stopping mechanism consists in the outer faces of the members 30, 32, which are substantially coplanar in the extended configuration 34, but this is can vary according to other embodiments. In the present illustration, the stopping mechanism 48 takes the form of two opposing flat surfaces adjacent the outer faces of the members 30, 32. Of course, other types of stopping mechanisms are possible, such as a stopping block, stopping plate or as part of a hydraulic cylinder. Additionally, in the present embodiment, the members 30, 32, can fold to form an angle between 135 and 45 degrees, and the accumulating arm is foldable to form a U-shape, with the inner arm 22 being substantially parallel to the distal member 32. With regard to the angle between 135 and 45 degrees, see, for example, in drawing FIGS. 4a, 4b, and 8, the angle denoted by the reference character "A" and the associated double-headed arrow. This configuration is of course optional, and can vary according to other embodiments. According to other embodiments, the outer surface of the members 30, 32, can be significantly planar, while the inner surface is curved and adapted to more easily grapple trees.

Figure 2C:
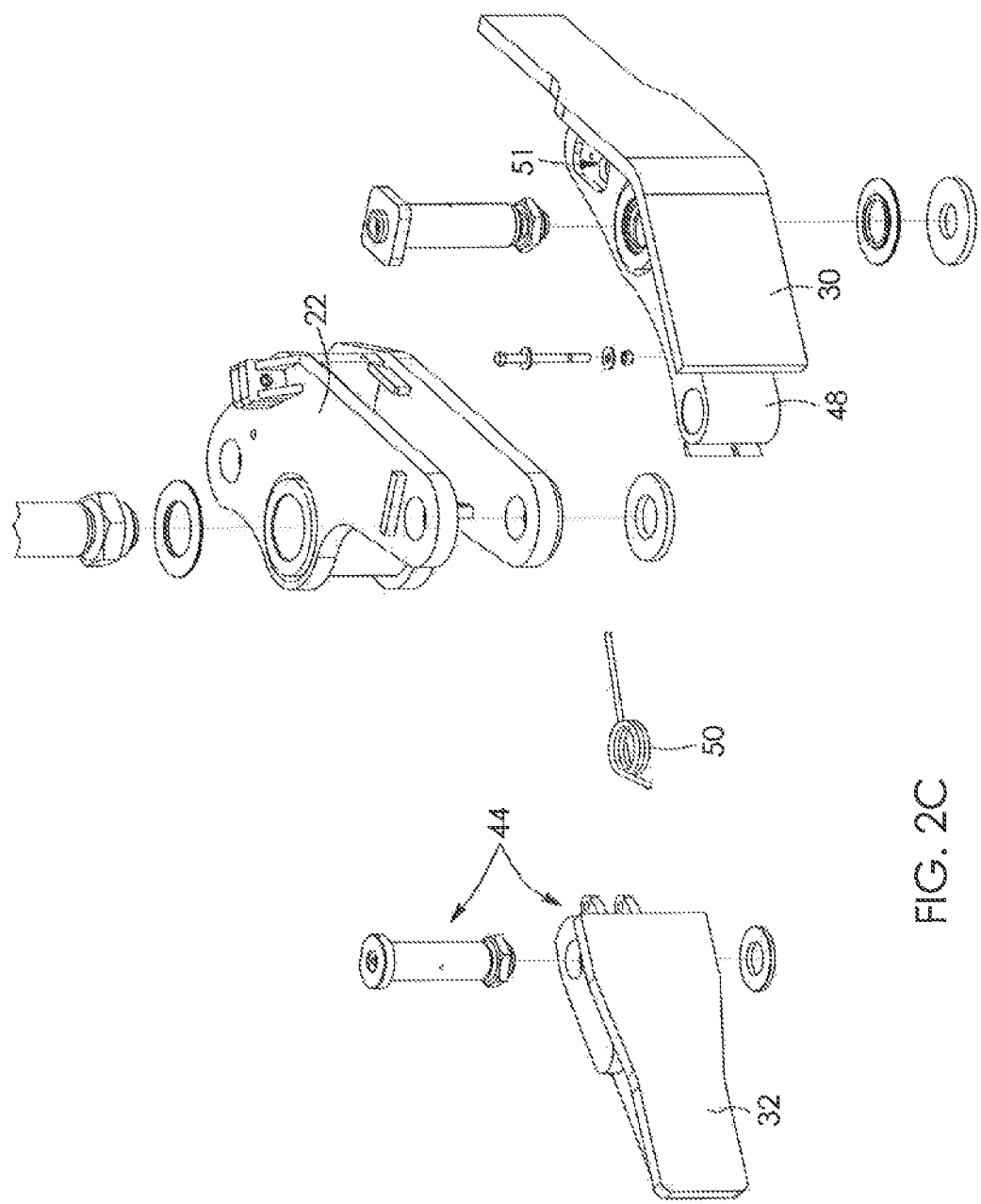
FIG. 2C is an exploded view of the accumulating arm in FIG. 2A.
Figure 3A:
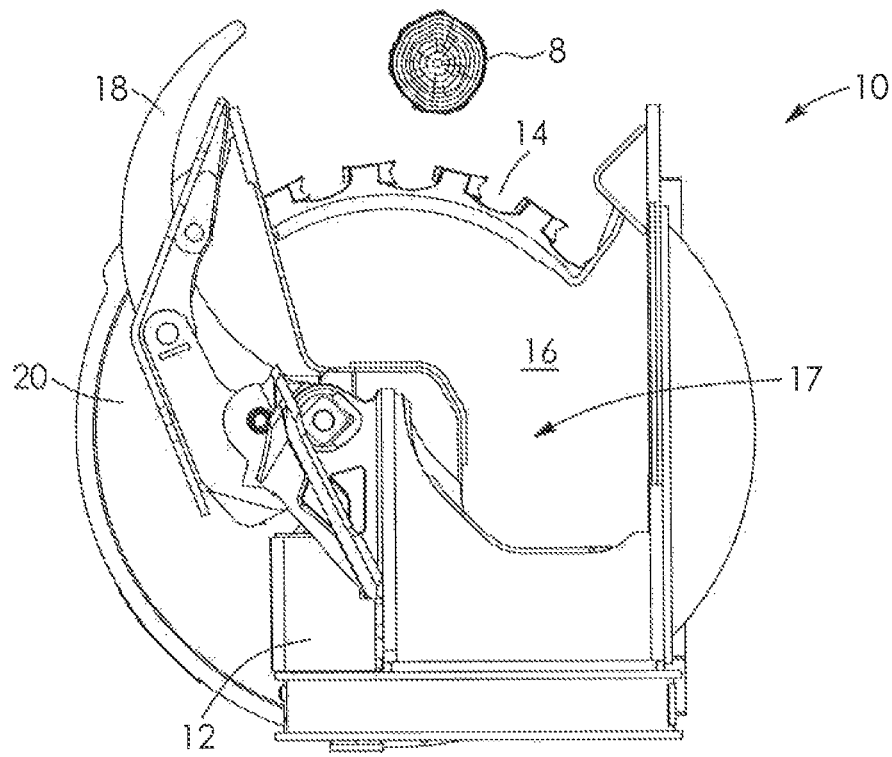
FIGS. 3a-3j are various plan views showing a possible sequence of operation of the forestry device, to gather and accumulate severed trees.
Figure 3B:
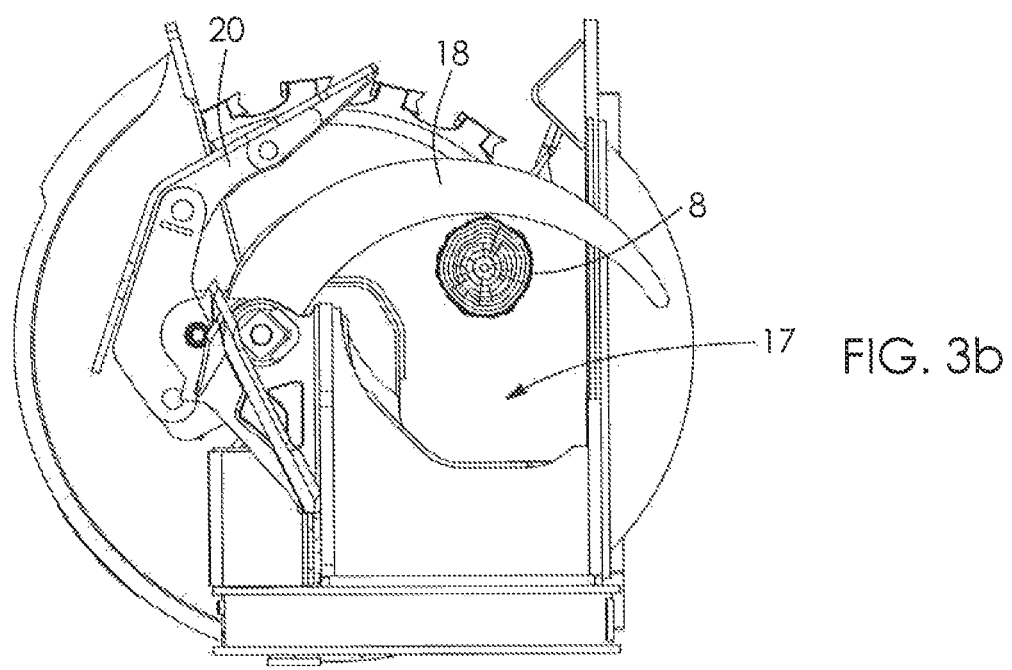
Figure 3C:
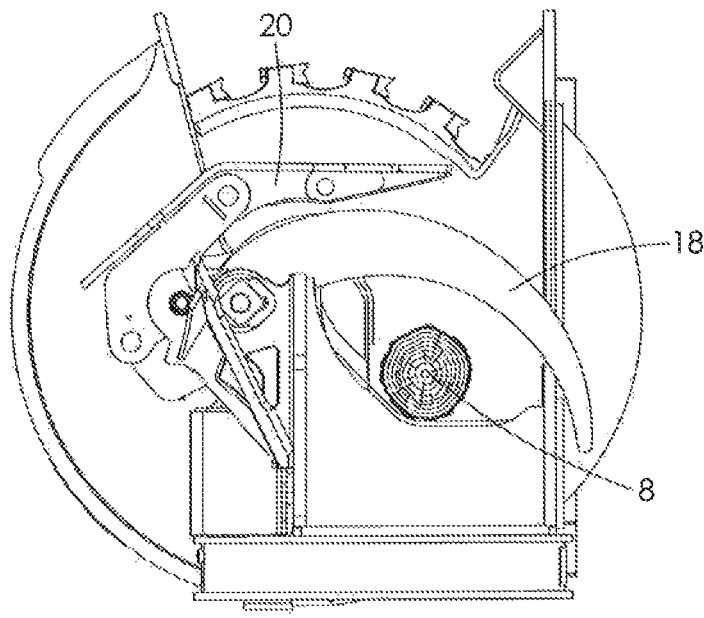
Figure 3D:
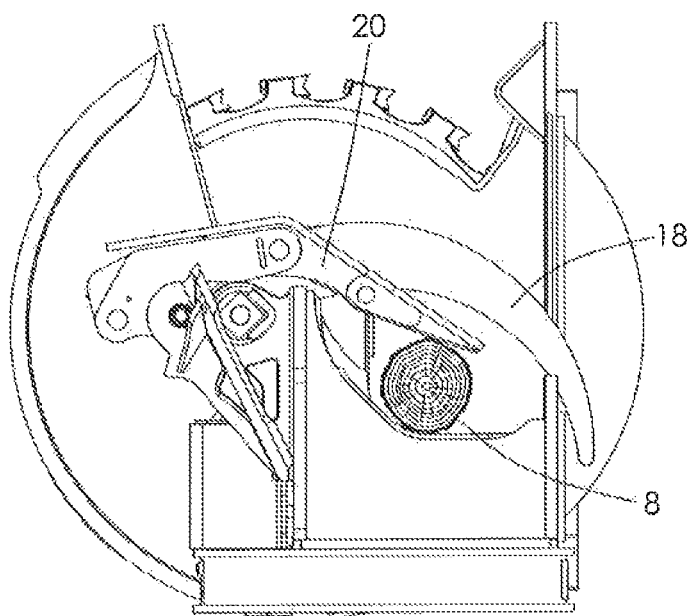
Figure 3E:
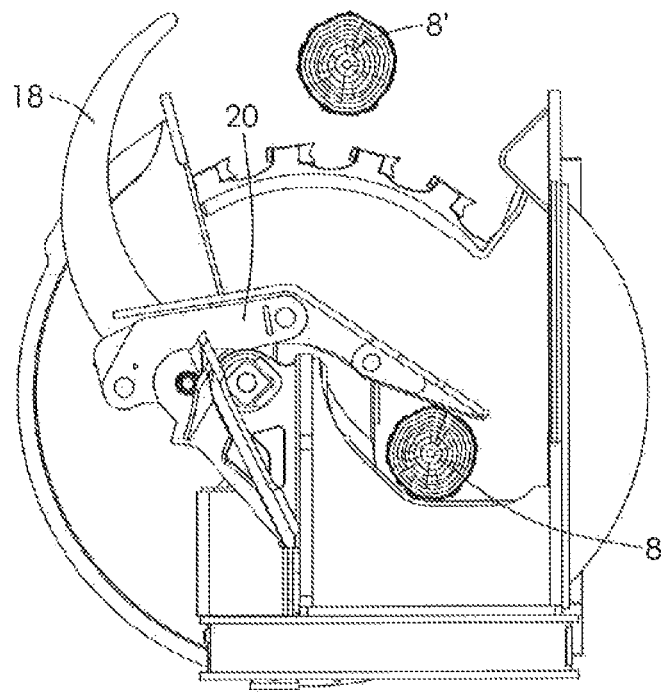
Figure 3F:
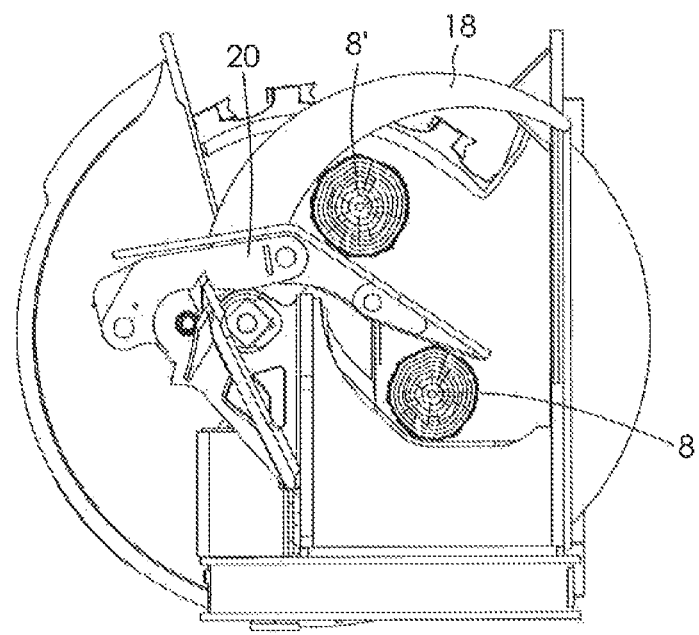
Figure 3G:
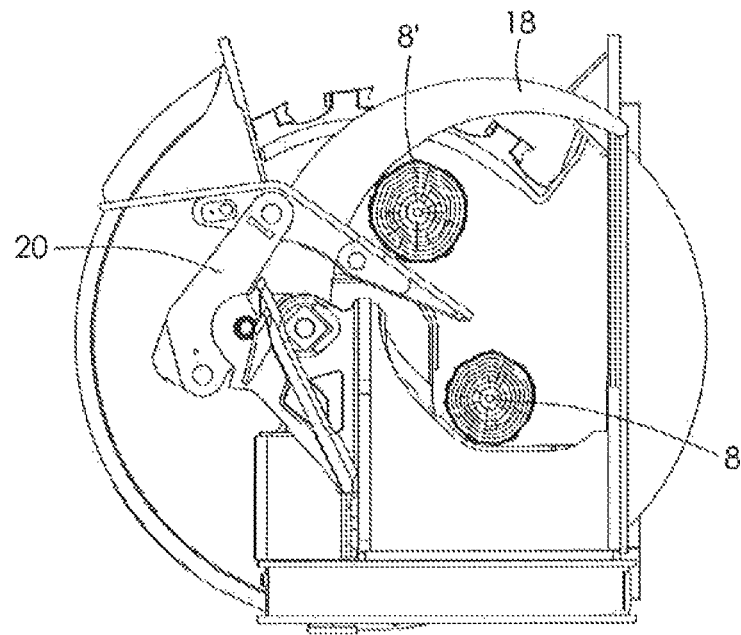
Figure 3H:
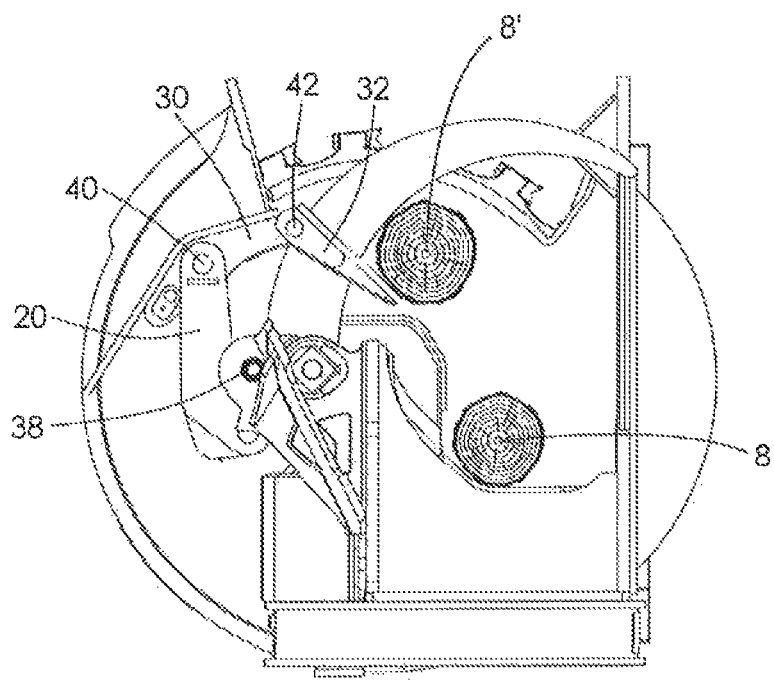
Figure 3I:
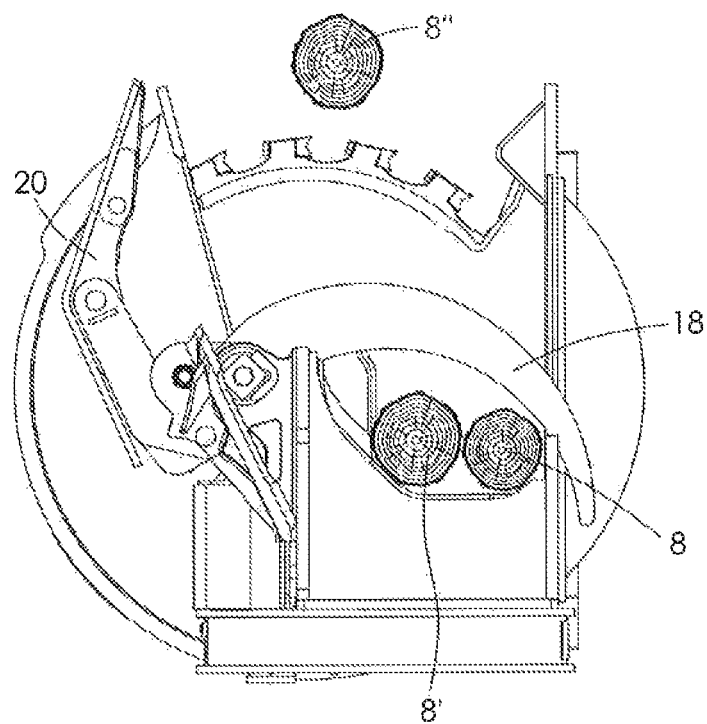
Figure 3J:
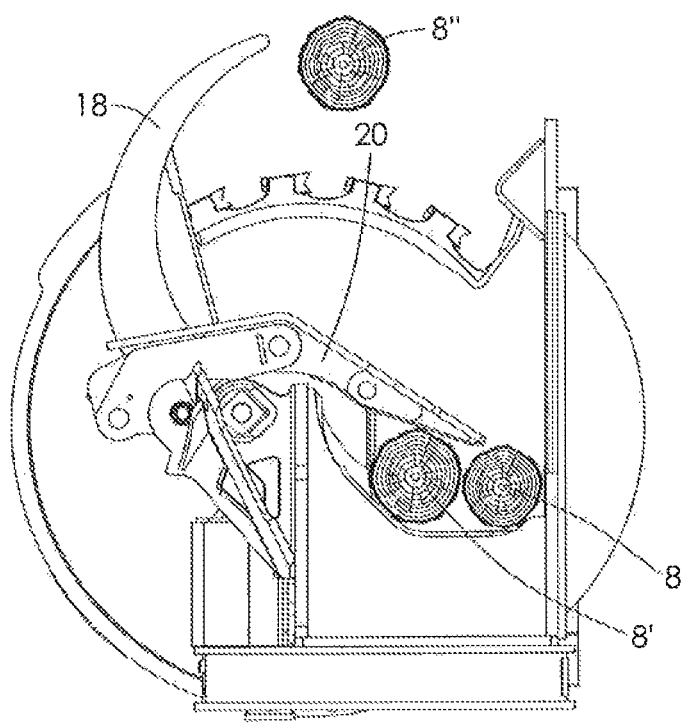

FIG. 2C shows an exploded view of the accumulating arm 20. In the illustrated embodiment, the articulation 28 is a hinge joint 44, but other types of articulations are also possible as long as they allow the distal member of the outer arm 32 to pivot relative to the proximate member of the outer arm 30 around the third pivot axis 38. The articulation 28 is provided with a second biasing element 50, in this case a torsion spring. In alternate embodiments, other types of biasing elements are possible, such as elastics, hydraulic cylinders or other equivalents are possible. The second biasing element 50 serves to bias the distal member 32 away from the proximate member 30, maintaining the outer arm in the extended configuration 34. In a preferred embodiment, the biasing force of the second biasing element 50 is less than that of the first biasing element 52 (an embodiment of which is shown in FIG. 1B), such as to allow outer arm 24 to bend while the accumulating arm moves towards the open configuration 34 under the force of the first biasing element 52. This biasing configuration, however, is not essential and can vary according to other embodiments.

FIGS. 3a-3j illustrate the sequence of operation for accumulating trees using a forestry device 10 of the invention, which is in this case a felling and bunching head provided with a severing device 14, as illustrated in FIGS. 1A and 1B. A similar process can of course be applied to other forestry devices according to the present invention. With both the first arm 18 and the accumulating arm 20 in an open position, a first tree 8 is introduced to the severing device 14. The severed tree 8 is swept by the first arm 18 towards the accumulation area 16. The accumulating arm 20 is then closed on the tree 8, securing it in place, and freeing the first arm 18 to return to the open position. A second tree 8' is then introduced to the severing device 14 and pulled by the first arm 18 towards the accumulation area 16. The second tree 8' is pushed up firmly against the accumulating arm 20. The accumulating arm 20 is then retracted from the accumulation area 16 by rotating the accumulating arm 20 about the first pivot axis 38 (identified in FIG. 3h). The retraction is facilitated by the inner member 30 pivoting around the second pivot axis 40, allowing the accumulating arm 20 to be pulled back through the trees 8 and 8'. The retraction is further facilitated by the distal member 32 pivoting around the third pivot axis 42, allowing the distal member 32 to fold inwardly towards the proximate member 30. With this third pivot axis 42 (identified in FIG. 3h), the outer member 32 can be retracted at a steep angle from the trees 8 and 8', requiring less rotation through the first and second pivot axes 38 and 40. Once retracted, the accumulating arm 20 can once again engage both trees 8 and 8'', freeing the first arm 18 to open once again to sweep more trees.

Figure 4A:
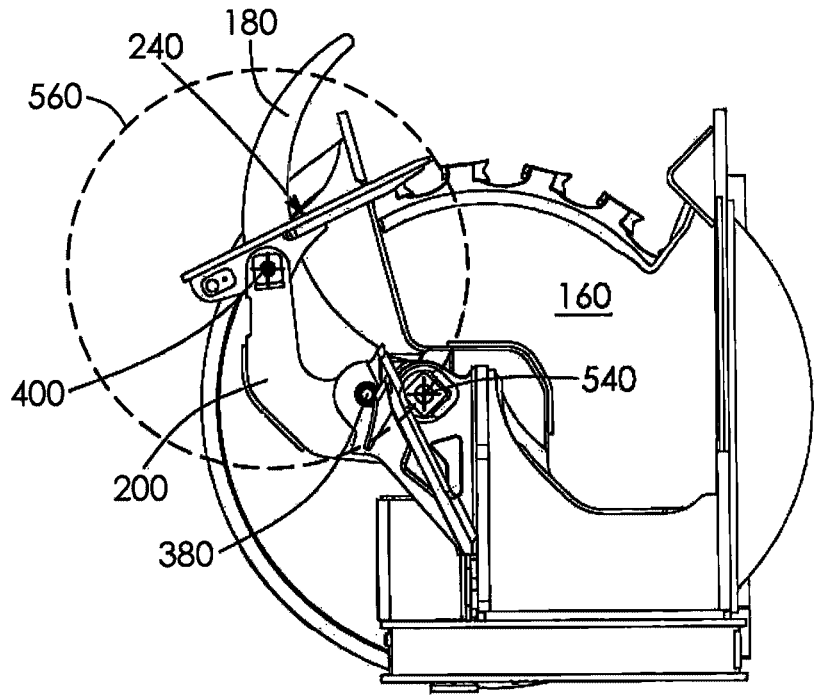
FIG. 4a is a top view of a felling and bunching head with the grab arm and the accumulating arm on different axes, demonstrating the large interference circle around an accumulating arm of the prior art.
Figure 4B:
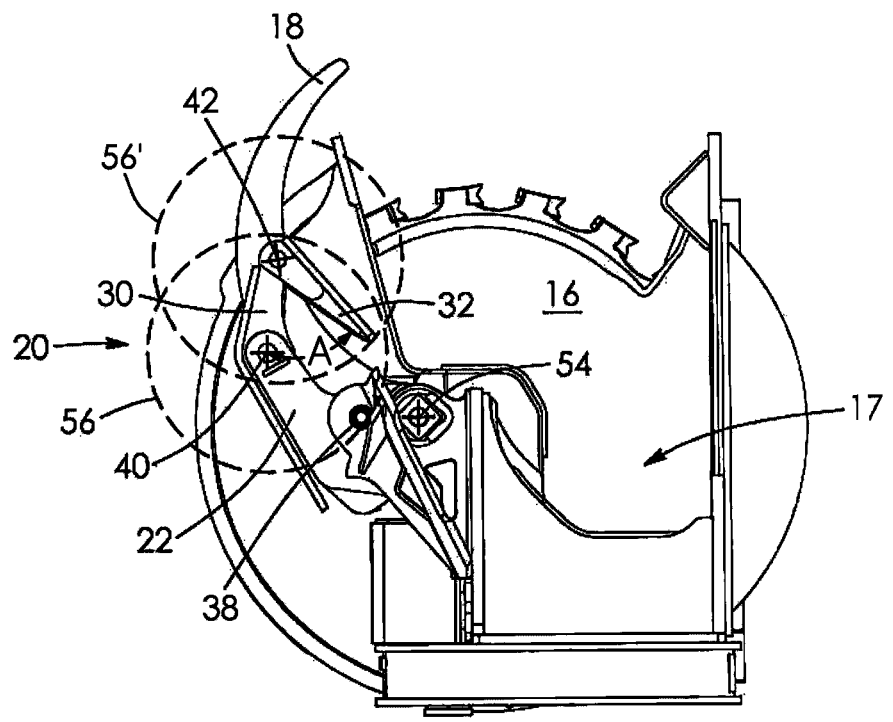
FIG. 4b is a top view of a possible embodiment of the forestry device of the present invention, demonstrating the reduced interference circle around the accumulating arm having its outer arm provided with an articulation.
Figure 4C:
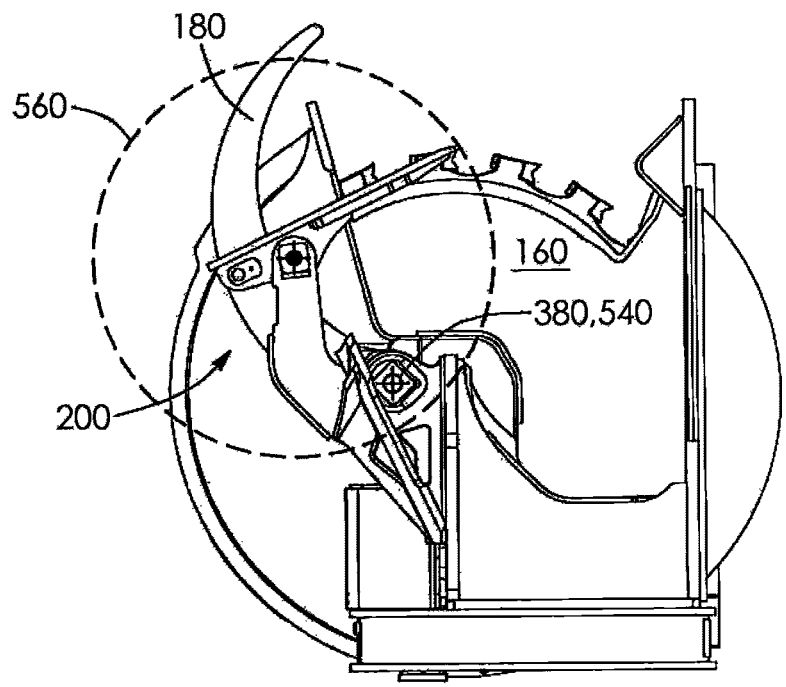
FIG. 4c is a top view of a felling and bunching head with the grab arm and the accumulating arm on the same axis, demonstrating the interference circle of an accumulating arm of the prior art.
Figure 4D:
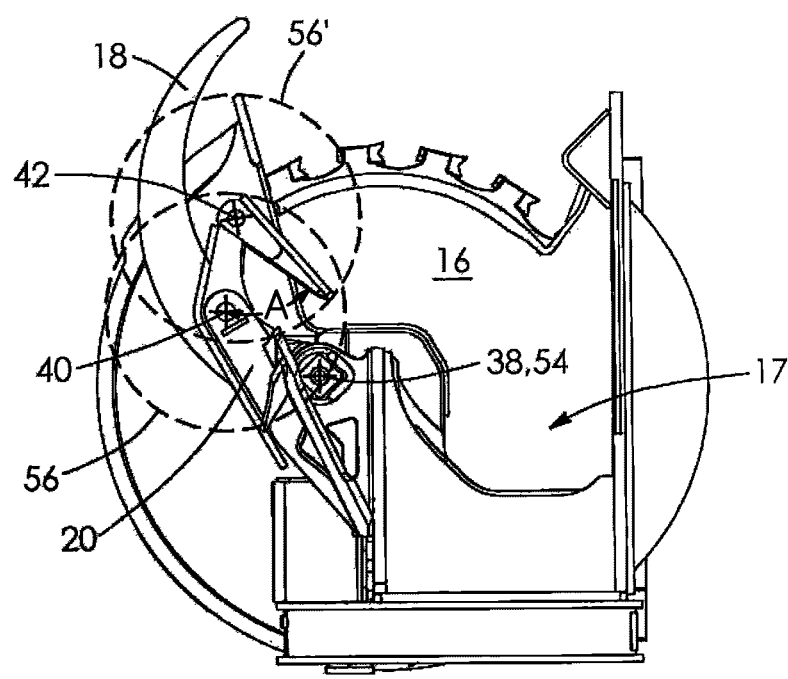
FIG. 4d is a top view another embodiment of the present invention in FIG. 4b with two arms on the same axis, demonstrating the interference circle around the accumulating arm having its outer arm provided with an articulation.

FIGS. 4A and 4B illustrate the conceptual advantage of the present invention over the prior art. In the prior art, the outer arm 240 of the accumulator arm 200 rotates solely about a second pivot axis 400. The minimum space required to retract the outer arm 240 is defined by a large interference circle 560 which corresponds to the smallest area through which the outer arm 240 can rotate. If a tree enters this interference circle 560, the accumulating arm 200 cannot retract, thus limiting the total number of trees which can be secured in the accumulation area 160. In contrast, the present invention provides the accumulating arm 20 with a third pivot axis 42, as per FIG. 4B. The distal member 32 can fold inwardly towards the proximate member 32, thus reducing the overall space required for the outer arm 24 to move during retraction. The minimum space required to retract the outer arm 24 is instead defined by two smaller interference circles 56 and 56'. The circle 56 is centered on the second pivot axis 40 and extends to the length of the proximate member 30, defining the minimum space required to move the proximate member 30. The second circle 56' is centered on the third pivot axis 42 and extends to the length of the distal member 32, defining the minimum space required to move the distal member 32. The overall interference of circles 56 and 56' is significantly smaller than its prior art counterpart 560, allowing more trees to fit in the accumulating area 16 without interfering with the accumulating arm 20, and allowing the accumulating arm 20 to retract through a shorter distance. The added third pivot axis 42 effectively gives the accumulating arm 20 an additional degree of freedom, allowing it to maneuver through trees in the accumulation area in more situations where the traditional accumulator arm 200 would otherwise get stuck. In the illustrated embodiment, the accumulating arm 20 pivots around a first pivot axis 38, while the first arm 18 pivots around a distinct first arm pivot axis 54 which is located on a different vertical axis. (i.e. the axes are offset from one another) FIGS. 4C and 4D illustrate the same advantage according to an alternate embodiment, where the first pivot axis of the accumulating arm 38 and the first arm pivot axis 54 are on the same vertical axis (i.e. they are coaxial).

Figure 5A:
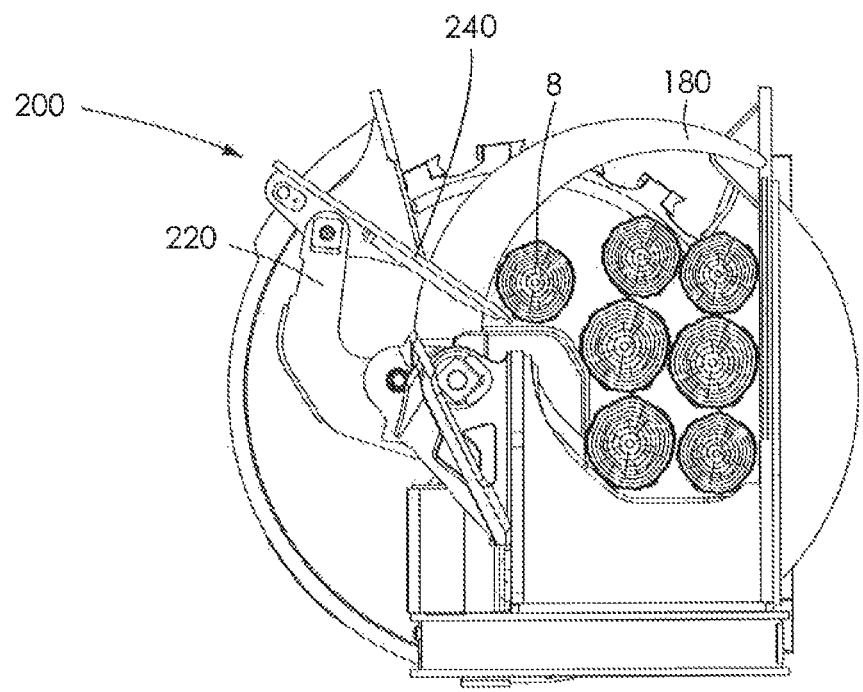
FIG. 5A is a top view of a prior art forestry device demonstrating the limitation of an accumulating arm having a single piece outer arm for retracting from the accumulation area.
Figure 5B:
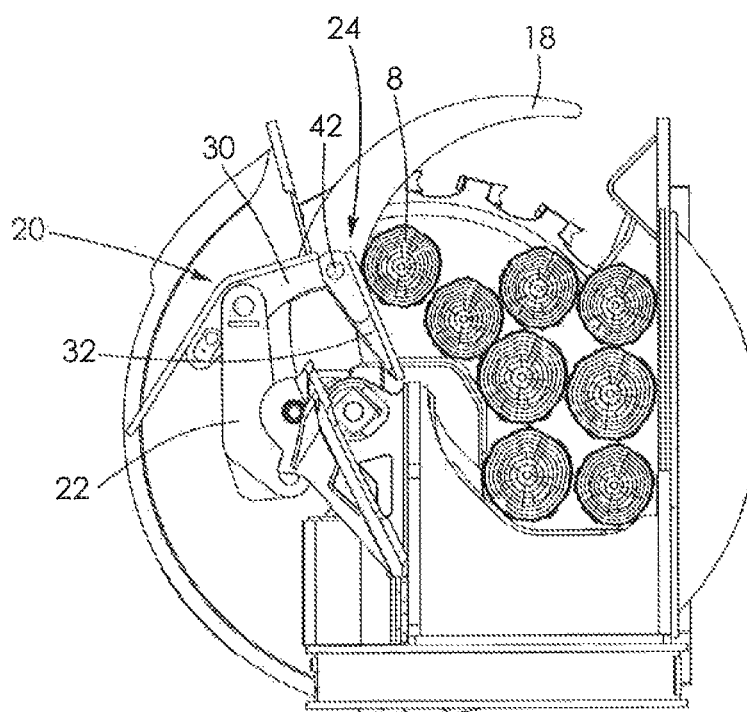
FIG. 5B is a top view of a possible embodiment of the forestry device, demonstrating the increased ability of the accumulating arm to retract from the accumulation area.

FIGS. 5A and 5B illustrate an advantage of the present invention over the prior art while in operation. Referring to FIG. 5A, when near capacity, a tree 8 held by the grab arm 180 of prior art would not be able to be held by the accumulating arm 200 because the accumulating arm 200 would be unable to retract completely. The outward retraction distance of the inner arm 220 is physically limited by a hydraulic cylinder (not shown) controlling the retraction motion of the inner arm 220. In the illustration, the inner arm 220 is at its maximal opening position can thus not retract any farther. Given that the inner arm 220 cannot retract any farther, the outer arm of the accumulating arm 240 would be unable to retract fully, as its retraction path is impeded by the tree 8. Consequently, in the present illustration, as an example only, the capacity is limited to seven trees. This means that in operation, in order to gather more trees, the forestry device of the prior art would complete a cycle by emptying its cargo after collecting only seven trees.

In contrast, in the present invention, and as shown in FIG. 5B, the accumulating arm 20 can be retracted fully, even at a higher capacity. While the accumulating arm is retracted, the outer member 32 pivots around the third pivot axis 42, allowing the outer member 32 to fold inwardly towards the inner member 30, making it such that the tree 8 is no longer in the retraction path. Even if the inner arm 22 is at its maximal opening position, the outer arm 24 can still retract fully because the folding action of the outer member 32 allows the outer arm 24 to move out of the accumulation area unobstructed. Consequently, since the accumulating arm 20 can be retracted, it can subsequently engage the tree 8 along with the existing trees, and continue gathering more trees. As a comparison to the exemplary capacity illustrated for the prior art; the capacity of the present invention is increased past the limit of seven trees. This is advantageous because more trees can be held in the accumulation area, increasing the accumulation capacity of the forestry device. In operation, this means that more trees can be held in the accumulation area per cycle, reducing the number of times the forestry device needs to empty its cargo, and thus effectively increasing the efficiency of the system.

Figure 6:
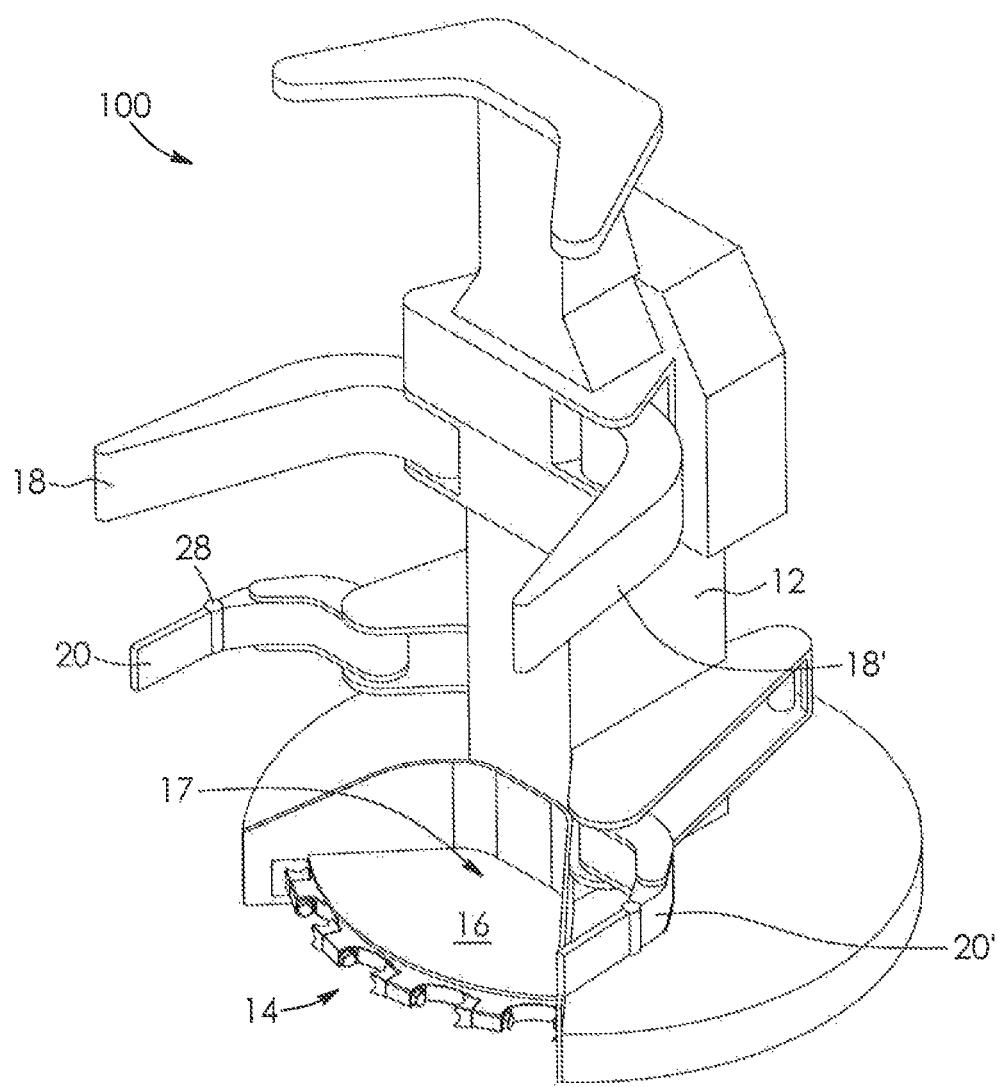
FIG. 6 is a perspective view of the forestry device according to an alternate embodiment of the present invention.

Of course, many alternate embodiments are possible which can benefit from the advantages of the present invention. For example, FIG. 6 is a perspective view of a first alternate embodiment of a forestry device 100, in this case a felling and bunching head. In this embodiment, there are two separate first arms 18 and 18' disposed on opposite sides of the frame 12. Additionally, the accumulating arm 20 is connected to the frame at a vertical position lower than the first arms 18. A second alternate embodiment of a forestry device 102, again in this case a felling and bunching head, is shown from a top view in FIG. 7. In this particular embodiment, the severing device 14 is a shear rather than a saw.

An advantage of the present invention is further illustrated in FIG. 8. This schematic shows the outer arm 24 of the accumulating arm 20. A first span 37 extends from the second pivot axis 40 to the distal end 33 of the distal member 32 while in an extended configuration. While in the folded configuration, a second span 37' extends from the second pivot axis 40 to the distal end 33 of the distal member 32. As is evident from the illustration, the span 37' in the folded configuration is smaller than the span 37 in the extended configuration, providing the arm with increased clearance, as highlighted in gray in the figure. The additional clearance is an improvement over existing accumulating arms which are not able to fold the outer arm 24. The added clearance allows the accumulating arm 20 to be retracted in a smaller space. This means that the motion required to retract the accumulating arm 20 is reduced. Given that moving the arm requires time and energy, both time and energy can be saved with the present invention when compared with prior art. In operation, this translates into yet further increases of efficiency per cycle.

Figure 9:
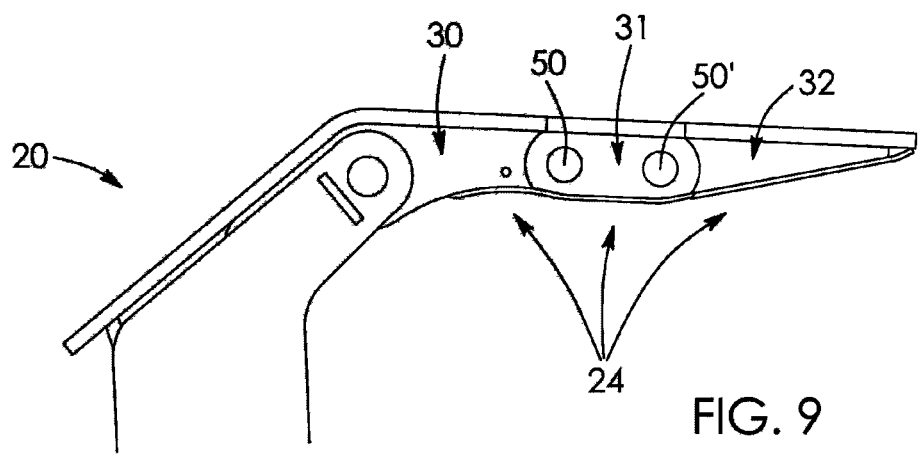
FIG. 9 is a schematic illustrating an alternate embodiment of the accumulating arm, the outer arm having more than one articulation.

Referring now to FIG. 9, a schematic of a further variant embodiment of the present invention is shown. In this embodiment, the outer arm 24 is instead divided into three sections, a proximate member 30, an intermediate member 31, and a distal member 32, further increasing the clearance of the accumulating arm 20. As the schematic demonstrates, according to alternate embodiments, the outer arm 24 can be further divided into three or more members, each of which is divided by an articulation which may be a pivot point, and each of which may be biased away from an adjacent member by means of biasing elements, 50 and 50'.

The scope of the claims should not be limited by the preferred embodiments set forth in the examples, but should be given the broadest interpretation consistent with the description as a whole.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A felling and bunching head, for gathering trees one after the other, comprising:
   a support frame having a first side and an opposed second side;
   an accumulation area, located proximate to the support frame, including an accumulating pocket located proximate to a lower portion of the support frame on the second side of the support frame;
   a first arm rotatable relative to the support frame, to gather trees; and
   an accumulating arm rotatable relative to the support frame, to secure one or more trees in the accumulation area and to retract from the accumulation area to allow a newly gathered tree to be added in the accumulation area, said accumulating arm including
   an inner arm pivotable relative to the support frame; and
   an outer arm pivotable relative to the inner arm about a first articulation, the outer arm including a second articulation, said second articulation dividing the outer arm into a proximate member and a distal member,
   such that when the accumulating arm is in a fully extended configuration and retaining trees, said first articulation and said second articulation of the accumulating arm are positioned over said accumulation area, with an outermost end of the of the distal member extending over the accumulating pocket, and with the accumulating arm being able to fully retract for accumulating additional trees in the accumulation area even when the accumulated trees occupy a substantial entirety of the accumulating pocket, such that when the accumulating arm is retracted, an angle is formed by the distal member of the outer arm being pivoted inwardly toward the proximate member about the second articulation, relative to the proximate member, said angle being an angle of from 45° to less than 90, so as to maximize a quantity of the trees secured in the accumulation area.

2. The felling and bunching head according to claim 1, wherein said outer arm of the accumulating arm is movable between an extended configuration and a folded configuration.

3. The felling and bunching head according to claim 2, wherein when the outer arm is in the extended configuration, the distal member is biased away from the proximate member, and in the folded configuration, the distal member is folded inwardly towards the proximate member.

4. The felling and bunching head according to claim 1, wherein the inner arm and the outer arm are pivotally mounted about a pivot axis, the outer arm having a span extending from said pivot axis to a distal end of the distal member, said span being smaller when the outer arm is in the folded configuration compared to when the outer arm is in the extended configuration.

5. The felling and bunching head according to claim 1, wherein the outer arm includes an intermediate member disposed between the proximate member and the distal member, said outer arm including additional articulations connecting adjacent ones of said distal, intermediate, and proximate members.

6. The felling and bunching head according to claim 5, wherein said adjacent ones of the distal, intermediate, and proximate members are biased away from one relative to the other.

7. The felling and bunching head according to claim 5, wherein the outer arm includes a stopping mechanism for constraining outward rotation of the proximate member and the distal member, said stopping mechanism including at least one of opposing flat surfaces, adjacent outer faces of the proximate and distal members, a stopping block, a stopping plate and/or a part of a hydraulic cylinder.

8. The felling and bunching head according to claim 1, wherein said proximate member and distal member of the outer arm are rotatably and resiliently mounted one relative to the other.

9. The felling and bunching head according to claim 1, wherein the accumulating arm includes at least three pivot axes.

10. The felling and bunching head according to claim 1, wherein said accumulating arm includes:
a first pivot axis for allowing the inner arm to pivot relative to the support frame;
a second pivot axis allowing the outer arm to pivot relative to the inner arm; and
a third pivot axis allowing said proximate member and distal member of the outer arm which are adjacent to pivot one relative to the other.

11. The felling and bunching head according to claim 1, wherein the second articulation includes a hinge joint.

12. The felling and bunching head according to claim 1, wherein the accumulating arm includes a first biasing element, biasing the outer arm away from the inner arm, and a second biasing element biasing the proximate member and distal member of the outer arm away one from the other.

13. The felling and bunching head according to claim 12, wherein said second biasing element biases the distal member away from the proximate member.

14. The felling and bunching head according to claim 12, wherein said second biasing element is a spring or a rubber band.

15. The felling and bunching head according to claim 1, further comprising a severing device configured to sever the tree.

16. The felling and bunching head according to claim 15, wherein the severing device includes one of a rotatable saw disk, shears, blades, and a chain saw.

17. The felling and bunching head according to claim 1, wherein the accumulation area includes a region located proximate to a frontward portion of the support frame.

18. The felling and bunching head according to claim 1, wherein said first arm and said accumulating arm are disposed on a same side relative to the accumulation area.

19. The felling and bunching head according to claim 18, wherein the first arm and the accumulating arm are disposed on the first side of the support frame.

20. The felling and bunching head according to claim 1, wherein said first arm and said accumulating arm have respective pivot axes for rotating relative to the frame, said pivot axes being coaxial.

21. The felling and bunching head according to claim 1, wherein said first arm and said accumulating arm have respective pivot axes for rotating relative to the support frame, said pivot axes being offset one from the other.

22. The felling and bunching head according to claim 1, wherein said first arm is located on a first side of the accumulation area, and said accumulating arm is located on an opposed side of the accumulation area, and further comprising another accumulating arm located on the first side of the accumulation area.

23. The felling and bunching head according to claim 1, wherein the first arm is a grab arm for sweeping the one or more trees in the accumulation area.

24. The felling and bunching head according to claim 1, wherein said first arm is configured similarly to said accumulating arm.

25. The felling and bunching head according to claim 1, wherein the first arm is disposed above the accumulating arm.

26. The felling and bunching head according to claim 1, wherein the first arm is disposed below the accumulating arm.

27. The felling and bunching head according to claim 1, wherein said distal member and said proximate member of the outer arm have inner surfaces contacting at least some of the gathered trees when the accumulating arm is in use.

28. A felling and bunching head configured to group trees, comprising:
a support frame, the support frame including a portion configured to receive a severing device;
an accumulation area located proximate to said portion of the support frame, including an accumulating pocket located proximate to a lower portion of the support frame; and
a first arm for gathering severed trees and an accumulating arm for accumulating the severed trees in the accumulation area, said first arm and said accumulating arm being pivotally mounted relative to the support frame, each of said first arm and said accumulating arm being movable from an open position in which the arm is clear of the accumulation area for receiving severed trees to a closed position in which the arm retains a severed tree in the accumulation area, said accumulating arm including an inner arm pivotable relative to the support frame and an outer arm pivotable relative to the inner arm about a first articulation, the outer arm including at least two members pivotable about a second articulation, and the outer arm being movable between a folded configuration in which the at least two members are inwardly folded, and an extended configuration in which the at least two members are biased away one from one another, with said first articulation and said second articulation of the outer arm being located above the accumulation area, when both the inner arm and the outer arm of the accumulating arm are in a fully extended configuration and retaining trees, and with an outermost end of the of the outer arm extending over the accumulating pocket, and with the accumulating arm being able to fully retract for accumulating additional trees in the accumulation area even when the accumulated trees occupy a substantial entirety of the accumulating pocket, such that when the accumulating arm is retracted, an angle is formed by the distal member of the outer arm being pivoted inwardly toward the proximate member about the second articulation, relative to the proximate member, said angle being an angle of from 45° to less than 90°, so as to maximize a quantity of the trees secured in the accumulation area.

29. The felling and bunching head according to claim 28, wherein said at least two members of the outer arm have inner surfaces contacting at least some of the gathered trees when the accumulating arm is in use.

30. The felling and bunching head according to claim 28, wherein both of said at least two members of the outer arm are located above the accumulation area when the inner arm is retaining a first tree in the accumulation area.

31. A felling and bunching head for gathering trees one after another, comprising:
  a support frame having a first side and an opposed second side;
  an accumulation area, located proximate to the support frame, including an accumulating pocket located proximate to a lower portion of the support frame;
  on each of the first side and the second side of the frame,
    a first arm rotatable relative to the support frame, the first arm being configured to gather a tree, and
    a second arm rotatable relative to the support frame, the second arm being configured to secure the gathered tree in the accumulation area and to retract from the accumulation area to allow a newly gathered tree to be added in the accumulation area,
  the second arm including an inner arm pivotable relative to the support frame, and an outer arm pivotable relative to the inner arm about a first articulation, the outer arm including a second articulation, with the second articulation dividing the outer arm into a proximate member and a distal member,
  such that when the second arm is in a fully extended configuration and retaining the trees, the first articulation and said second articulation of the second arm are positioned over the accumulation area, with an outermost end of the of the distal member extending over the accumulating pocket, and
  with the second arm being able to fully retract for accumulating additional trees in the accumulation area even when the accumulated trees occupy a substantial entirety of the accumulating pocket, such that when the second arm is retracted, an angle is formed by the distal member of the outer arm being pivoted inwardly toward the proximate member about the second articulation, relative to the proximate member, said angle being an angle of from 45° to less than 90°,
  so as to maximize a quantity of the trees secured in the accumulation area.

32. The felling and bunching head according to claim 31, wherein both of the second arms are connected to the support frame at a vertical position lower than both of the first arms.

33. The felling and bunching head according to claim 31, wherein the first arm on the first side of the support frame is offset vertically from the first arm on the second side of the support frame, and the second arm on the first side of the support frame is offset vertically from the second arm on the second side of the support frame.

* * * * *